US008964953B2

(12) United States Patent
McKnight et al.

(10) Patent No.: US 8,964,953 B2
(45) Date of Patent: Feb. 24, 2015

(54) INCREMENTAL VALUATION BASED NETWORK CAPACITY ALLOCATION

(71) Applicant: Microsoft Corporation, Redmond, WA (US)

(72) Inventors: Gregory Joseph McKnight, Bellevue, WA (US); David T. Harper, III, Seattle, WA (US); Christopher Hanaoka, Bellevue, WA (US); Eric C. Peterson, Woodinville, WA (US); Ming Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/738,972

(22) Filed: Jan. 10, 2013

(65) Prior Publication Data

US 2014/0195366 A1 Jul. 10, 2014

(51) Int. Cl.
*H04M 15/00* (2006.01)
*G06Q 30/08* (2012.01)

(52) U.S. Cl.
CPC .................................... *G06Q 30/08* (2013.01)
USPC ...................................... 379/114.06; 705/37

(58) Field of Classification Search
CPC ......................... G06Q 30/0283; H04L 67/104
USPC ....................................... 379/114.06; 705/37
See application file for complete search history.

(56) References Cited

U.S. PATENT DOCUMENTS 5,347,511 A 9/1994 Gun
5,359,649 A 10/1994 Rosu et al.
7,979,543 B2 7/2011 Xie
8,051,481 B2 11/2011 Baldonado et al.
8,260,959 B2 9/2012 Rudkin et al.
8,600,767 B2 * 12/2013 Aaron et al. .................. 705/1.1

(Continued)

FOREIGN PATENT DOCUMENTS

KR 1020090042495 A 4/2009

OTHER PUBLICATIONS

Shah, et al., "Dynamic Multipath Routing of Multi-Priority Traffic in Wireless Sensor Networks", Retrieved at <<https://www.usukita.org/sites/default/files/P5_sshah_multipath_dynamic_routing.pdf>>, In Proceedings of the 6th Annual Conference of International Technology Alliance, Sep. 18, 2012, pp. 8.

(Continued)

*Primary Examiner* — Creighton Smith
(74) *Attorney, Agent, or Firm* — Jim Sfekas; Kate Drakos; Micky Minhas

(57) ABSTRACT

A bid-based network sells network capacity on a transaction-by-transaction basis in accordance with bids placed on transactions. A transaction is the transmission of a quantum of data across at least some portion of the network, where the quantum of data can be as small as a single packet. Bids for network capacity are ranked in order of monetary value, or other criteria relevant to the network service provider. The amount charged to the highest bidder is based on the maximum bid of the next highest bidder. Bids are evaluated on a real-time basis at the time when the link is ready to transmit data. An automated system makes individual bids at each link through which data is transmitted and can take into account additional criteria that can be specified as part of the bid information, including latency and routing requirements. Bid information is passed with data through the network.

20 Claims, 5 Drawing Sheets

(56) References Cited

U.S. PATENT DOCUMENTS

2002/0194108 A1* 12/2002 Kitze .............................. 705/37
2003/0101124 A1 5/2003 Semret et al.
2005/0058065 A1 3/2005 Tiller et al.
2007/0133571 A1 6/2007 Kahn et al.
2008/0167948 A1 7/2008 Park
2009/0198608 A1 8/2009 Jain et al.

OTHER PUBLICATIONS

"International Search Report and Written Opinion Issued in PCT Patent Application No. PCT/US20141010945", Mailed Date: Oct. 27, 2014, 11 pages.

* cited by examiner

INCREMENTAL VALUATION BASED NETWORK CAPACITY ALLOCATION

BACKGROUND

The throughput of communications between computing devices continues to increase as modern networking hardware enables physically separate computing devices to communicate with one another orders of magnitude faster than was previously possible. Consequently, data, including large quantities of data, can be transferred between computing devices within ever decreasing time frames. The processing of such data, therefore, need not be limited to the computing device on which such data is currently stored, as modern networking hardware enables such data to be communicated to one or more other computing devices, where such data can then be processed.

Because there exist a myriad of advantages to being able to transfer data, including large quantities of data, between computing devices, individuals, businesses, and other institutions, often do so, typically by purchasing network capacity from a network resource or service provider. Traditionally, such network capacity is purchased in discrete units of time, and at a particular bandwidth. For example, a business may seek to purchase network capacity for one month where such network capacity will provide the business with the ability to transfer one gigabit of data per second, for the entire month, over the network being provided by the network service provider. Network service providers then maintain, and provide access to, the relevant networking hardware to enable two or more disparate computing devices to communicate with one another and transfer data between one another.

Unfortunately, the purchase and sale of network capacity in units of time results in inefficiencies because typical network utilizations are not continuous, but rather can vary greatly. For example, a business may have purchased a sufficient capacity to transmit one gigabit of data per second, but it is likely that the business fully utilizes such capacity only infrequently, such as during normal business hours, or during scheduled data transfer operations. For the remaining time, the network capacity purchased by such a business remains unutilized. Unfortunately, however, the network service provider has had to invest time and resources in purchasing and maintaining networking hardware to provide the network capacity that was purchased by that network service provider's customers. When such capacity is unutilized, or underutilized, the investments made by the network service provider are simply spread out over a smaller number of customers or utilizations, resulting in inefficiencies, which are born both by the network service provider, and by its customers in the form of higher pricing.

SUMMARY

In one embodiment, network capacity can be purchased on a transaction-by-transaction basis through a market-based system in which potential purchasers of network capacity bid for such capacity and the network provider selects a most desirable purchaser to whom the network provider will sell network capacity for the specified transaction. A transaction can entail the transmission of a quantum of data across at least some portion of the network provided by the network service provider. The quantum of data can be as small as a single packet, or can comprise multiple packets, or other like divisions of data.

In yet another embodiment, bids for network capacity can be ranked in order of monetary value, if the network service provider seeks to maximize revenue, or can be ranked by other criteria relevant to the network service provider. A highest bid, based on the ranking applied, can be selected and network capacity can be sold based on that bid, and based on other competing bids, such that the amount charged is an incremental amount greater than the next highest bid.

In a further embodiment, bids can be evaluated on a real-time basis such that the bids for the transmission of data over a given link between two points in a network of computing devices can be evaluated at the time when the link is ready to transmit data from a starting point of the link to an ending point of the link. A bid can be specified for a transaction comprising the transmission of data across multiple links, and an automated system can make individual bids at each link through which the data is to be transmitted, so long as such individual bids do not exceed the bid specified for the overall transaction.

In a still further embodiment, automated bidding algorithms can take into account additional criteria that can be specified as part of the bid information, such as a latency requirement, a routing requirement, or other like criteria. Bid information associated with a quantum of data can be passed with such data through the network of computing devices such that the bid information can be utilized, at each link, to generate bids for the transmission of the quantum of data across such a link.

In a yet further embodiment, the prices paid by customers for the transmission of data across discrete links of a network of computing devices maintained by a network service provider can be utilized to identify links to which additional capacity can be profitably added, and can be utilized for other like network capacity planning purposes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
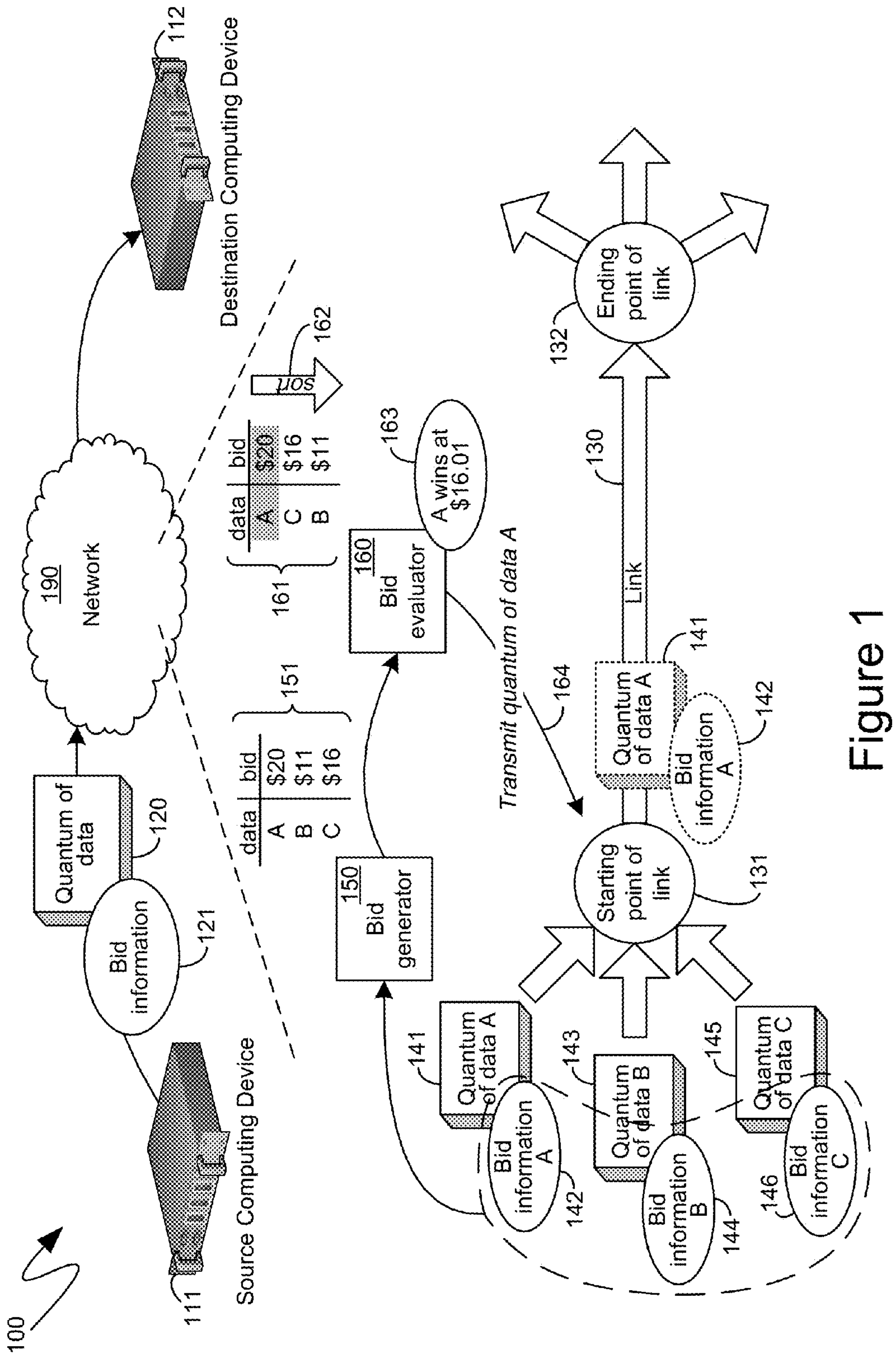
FIG. 1 is a block diagram of an exemplary evaluation of bids for network capacity.

The following description relates to a bid-based network, where network capacity is purchased on a transaction-by-transaction basis in accordance with bids placed on a particular transaction. A transaction can entail the transmission of a quantum of data across at least some portion of the network, where the quantum of data can be as small as a single packet, or can comprise multiple packets, or other like divisions of data. Bids for network capacity can be ranked in order of monetary value, if the network service provider seeks to maximize revenue, or can be ranked by other criteria relevant to the network service provider. The amount charged to the highest bidder, after ranking the bids, can be based on the maximum bid of the next highest bidder. Bids can be evaluated on a real-time basis such that the bids for the transmission of data over a given link between two points in a network can be evaluated at the time when the link is ready to transmit data from its starting point to its ending point. A bid can be specified for a transaction comprising the transmission of data across multiple links, and an automated system can make individual bids at each link through which the data is to be transmitted, so long as such individual bids do not exceed the bid specified for the overall transaction. Such automated bidding algorithms can take into account additional criteria that can be specified as part of the bid information, including latency requirements, routing requirements, or other like criteria. Bid information associated with a quantum of data can be passed with such data through the network of computing devices such that the bid information can be utilized, at each link, to generate bids for the transmission of the quantum of data across such a link. Ultimately, the prices paid by customers for the transmission of data across discrete links of a network of computing devices maintained by a network service provider can be utilized to identify links to which additional capacity can be profitably added, and can be utilized for other like network capacity planning purposes.

The techniques described herein make reference to specific transactions on which bids and the specific types of criteria that can be specified. For example, reference is made to bids placed on a per-packet, per-link basis. Similarly, as another example, reference is made to specifications of latency or routing. Such references, however, are strictly exemplary and are made for ease of description and presentation. Indeed, the specific examples selected are intended to illustrate the described mechanisms at a most simple level for clarity and ease of understanding. The references and specific examples to per-packet, per-link bidding, and to specifications of latency and routing, are not intended to limit the mechanisms described to specific embodiments. Instead, the techniques described herein are equally applicable, without modification, to the evaluation of bids for any transaction, irrespective of quantity of data being transmitted across the network or the number of network links through which such data will be transmitted. Similarly, the techniques described herein are equally applicable, without modification, to specifications of other criteria beyond merely latency and routing.

Although not required, aspects of the descriptions below will be provided in the general context of computer-executable instructions, such as program modules, being executed by a computing device. More specifically, aspects of the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional server computing racks or conventional personal computers, and include other computing configurations, including hand-held devices, multi-processor systems, microprocessor based or programmable consumer electronics, network PCs, mini-computers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary system 100 is illustrated, comprising a source computing device 111, a destination computing device 112, and the network 190 that can communicationally couple source computing device 111 to the destination computing device 112. To provide context for the descriptions below, the network 190 can be maintained by a network service provider that can provide access to the network 190 to purchasers of network capacity, we can then utilize such network capacity to transmit computer readable data and instructions from one computing device to another, such as from the source computing device 111, to the destination computing device 112. As will be recognized by those skilled in the art, the network 190 can comprise multiple computing devices, including general purpose computing devices, such as server-computing devices, and special-purpose computing devices, such as routers, switches, firewalls, and other like special-purpose computing devices which can often comprise specialized circuitry to enable the performance of specific operations more quickly, or at "line rate".

In one embodiment, a customer of the service provider of the network 190 can seek to transmit a quantum of data 120 across the network 190 from the source computing device 111 to the destination computing device 112. Such a quantum of data 120 can, in one embodiment, be a single packet of data, or other like atomic unit of data that is not subdivided further. In such an embodiment, the aggregate data that the customer seeks to transmit from the source computing device 111 to the destination computing device 112 can be divided into packets and each packet can be treated as a separate transaction. Consequently, the amount such a customer can be charged can be an aggregate amount charged for the transmission of each packet, since each packet can be treated as a separate transaction with independently established monetary considerations. In another embodiment, the quantum of data 120 can comprise two or more packets of data, up to and including all of the aggregate data that the customer seeks to transmit from the source computing device 111 to the destination computing device 112. As will be illustrated below, the mechanisms described are agnostic as to the quantity of data associated with a given transaction.

In seeking to transmit the quantum of data 120 across the network 190, the customer can provide bid information 121 that can be associated with the quantum of data 120 and can indicate an amount that the customer is willing to pay to transmit the quantum of data 120 from the source computing device 111 to the destination computing device 112. Such bid information 121 can then be utilized to determine which data to transmit across the network 190 and how much to charge for such a transmission. A simplified example is provided in the exemplary system 100 of FIG. 1 within the context of a single link 130 between two computing devices, including general-purpose computing devices and specific-purpose computing devices, that comprise the network 190. As illustrated, the single exemplary link 130 can represent a communicational connection between a computing device, including either a general-purpose computing device or a specific-purpose computing device, that can act as the starting point 131 of the link 130, and another computing device, which can also be a general-purpose computing device or a specific-purpose computing device, that can act as the ending point 132 of the link 130.

In the illustrated embodiment, the starting point 131 of the link 130 can comprise multiple other links that end at the starting point 131 of the link 130. One or more of such links can provide, to the starting point 131 of the link 130, one or more quanta of data, such as the quanta of data 141, 143 and 145 that can have been transmitted through the network 190 up to the starting point 131 of the link 130. In one embodiment, each of the quanta of data 141, 143 and 145 can have bid information associated with them, such as the bid information 142, 144 and 146, respectively.

The bid information 142, 144 and 146 can be utilized, such as by a bid generator 150, to generate bids 151 for each of the quanta of data 141, 143 and 145. More specifically, the bids 151 can represent the amount of money a customer is willing to pay to transmit one of the quanta of data 141, 143 and 145 across the link 130. Thus, for example, the bid information 142 associated with the quantum of data 141 can be processed by the bid generator 150 to determine that a bid of twenty dollars is to be made to transmit the quantum of data 141 across the link 130. Similarly, as another example, the bid information 144 associated with the quantum of data 143 can be processed by the bid generator 150 to determine that a bid of eleven dollars is to be made to transmit the quantum of data 143 across the link 130. To complete the example, the bid information 146 associated with the quantum of data 145 can be processed by the bid generator 150 to determine that a bid of sixteen dollars is to be made to transmit the quantum of data 145 across the link 130. The exemplary bids 151 are provided strictly by way of example to illustrate the mechanisms contemplated, and are not intended to reflect or signify actual bid amounts. To the contrary, in implementation, it is likely that bid amounts would be substantially lower, such as fractions of a penny, for a single link, such as the link 130, especially for quanta of data that are single packet in size.

The bids 151 for transmitting a quantum of data across the link 130 can be evaluated by a bid evaluator 160 at a time when the link 130 is ready to carry another quantum of data from the starting point 131 of the link 130 to the ending point 132 of the link 130. In one embodiment, the bid evaluator 160 can sort, as illustrated by the sort action 162, the bids 151 into a sorted collection of bids 161. Such a sorting 162 can be based on any number of criteria, as established by a network service provider. For example, if the network service provider of the network 190 sought to maximize its revenue, the sort action 162 can sort the bids 151 into the sorted collection of bids 161 based on the monetary value of the bids, with the exemplary twenty dollar bid being sorted ahead of the exemplary sixteen dollar bid and the exemplary eleven dollar bid. As another example, if the network service provider of the network 190 sought to maximize utilization of the network 190, it could sort the bids 151 into the sorted collection of bids 161 based on a size or type of the quanta of data that such bids were directed to. For purposes of illustrating the contemplated mechanisms, however, reference will be made to the sorting of bids based on monetary value in accordance with a network service provider that seeks to maximize its revenue. Thus, in the example illustrated in FIG. 1, the bid of twenty dollars associated with the quantum of data 141 can be the highest, or most prominent, bid, as sorted by the sort action 162. Consequently, the bid evaluator 160 can determine that the quantum of data 141 has "won" the bidding and can instruct, as illustrated by the instruction 164, the starting point 131 of the link 130 to next transmit the quantum of data 141 across the link 130.

In one embodiment, the customer transmitting the quantum of data 141 can be charged based not only on the bid information 142 associated with the quantum of data 141 but also based on competing bid information, such as the bid information 144 and bid information 146. For example, although the bid for the transmission of the quantum of data 141 across the link 130 can have, exemplarily, been twenty dollars, the bid evaluator 160 can determine 163 that the customer transmitting the quantum of data 141 need only be charged an incrementally greater amount than the next highest bid such as the exemplary sixteen dollar bid associated with the quantum of data 145. Thus, for example, the bid evaluator 160 can determine that the customer transmitting the quantum of data 141 need only be charged 16 dollars and one cent if the bid increments are in minimums of one cent. As will be recognized by those skilled in the art, other bid incremental values, including small fractions of a cent, can be equally utilized. In such a manner, the cost of transmitting data across the network 190 can be based, not on what a single customer is willing to pay, but rather on the market rate established through a competitive bid-based structure. Thus, in a situation where only a single customer is bidding for the transmission of a quantum of data across a link, and no competitive bids are received, such network capacity can be provided for free or at some minimum threshold amount below which network capacity will not be sold, which can be established by the network service provider.

Once the bid evaluator 160 determines that the quantum of data 141 is to be next transmitted across the link 130, the quantum of data 141 and, optionally, the associated bid information 142 can be transmitted across the link 135, from the starting point 131 of the link 130, as illustrated by the dashed-line-images shown in FIG. 1. As will be described in further detail below, if the ending point 132 of the link 130 is not the final destination of the quantum of data 141, the above-described process can be repeated at the ending point 132 of the link 130, and at each link starting point, which, as will be recognized by those skilled in the art, is the ending point of the preceding link.

In one embodiment, the bid generator 150, the bid evaluator 160, or combinations thereof can be implemented in the form of computer-executable instructions that can be executed at each starting point, such as the starting point 131 of the link 130. As indicated previously, such a starting point can be a general-purpose computing device, such as a server computing device, in which case the bid generator 150 and the bid evaluator 160 can be computer-executable instructions configured to execute on general-purpose computing devices and processing units. Alternatively, as also indicated previously, such a starting point can be a specific-purpose computing device, such as a switch or router, in which case the bid generator 150 and the bid evaluator 160 can be computer-executable instructions configured to execute on application-specific integrated circuits and other like processing units present in such specific-purpose computing devices. In another embodiment, the bid generator 150 and the bid evaluator 160 can be centrally implemented such that one or more computing devices in the network 190 acts as the bid generator 150, the bid evaluator 160, or combinations thereof for multiple links in the network 190, such as the exemplary link 130.

Figure 2:
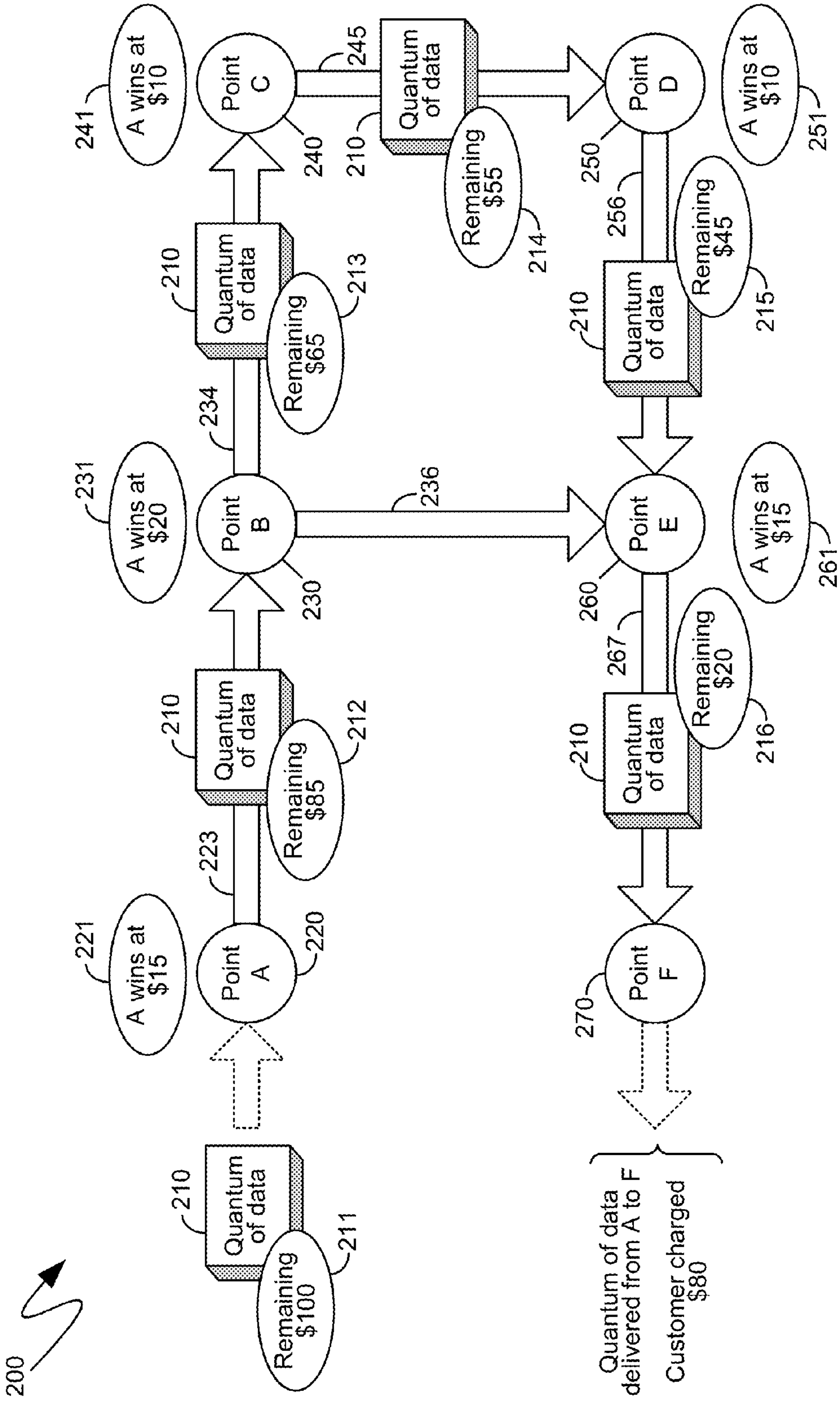
FIG. 2 is a block diagram of another exemplary evaluation of bids for network capacity.

Turning to FIG. 2, the system 200 shown therein illustrates an exemplary propagation of a single quantum of data through a network, such as the exemplary network 190 shown in FIG. 1, on a link-by-link basis. As indicated previously, in one embodiment, a bid for the transmission of a quantum of data can be only for the transmission of that quantum of data across a single link, and can be evaluated at the time when such a link is ready to transmit a quantum of data. In such an embodiment, a customer could theoretically submit different, specific bids for each specific link that the customer's data would traverse. Alternatively, however, the customer could also submit an aggregate bid information, such as the aggregate bid information 211, that is associated with a quantum of data 210, where the aggregate bid information 211 represents an amount which that customer is willing to pay to transmit the quantum of data 210 from a starting point to an ending point, irrespective of the number of intermediate links traversed in transmitting the quantum of data 210 from the starting point to the ending point.

To illustrate such an embodiment, the quantum of data 210, shown in the exemplary system 200 of FIG. 2, can be sought to be transmitted from a starting point 220 to a ending point 270, and the aggregate bid information 211 that can be associated with the quantum of data 210 can represent a total amount that a customer is willing to pay to transmit the quantum of data 210 from the starting point 220 to the ending point 270. In such an embodiment, as will be described in detail below, the bids generated from the bid information attached to the quantum of data 210, such as from a bid generator, can take into account the aggregate bid information 211 as the quantum of data 210 proceeds through the network.

Initially, to transmit the quantum of data 210 from the point 220 to the point 230 across the link 223, a bid generator can generate a bid for the quantum of data to be transmitted across the link 223, such as in the manner described in detail above. Subsequently, in a manner analogous to that also described in detail above, a bid evaluator can evaluate bids received for the transmission of data across the link 223 and can, for exemplary purposes, determine that the quantum of data 210 has "won" the bidding with, for example, a price of fifteen dollars, as illustrated by the determination 221. As part of the transmission of the quantum of data 210 across the link 223, the bid information associated with the quantum of data can be modified from the bid information 211 to the bid information 212 that can be transmitted, together with the quantum of data 210, across the link 223. In one embodiment, the bid information 212 can compile an indication of how much of the aggregate bid, for the transmission of the quantum of data 210 across the network, remains after the quantum of data 210 is transmitted across the link 223. In the particular example illustrated by the system 200 of FIG. 2, the bid information 212 can indicate that eighty-five dollars remains of the initial one hundred dollar aggregate bid, after the cost of fifteen dollars for the transmission of the quantum of data 210 across the link 223.

At the point 230, the quantum of data 210 can either be transmitted along the link 234 or along the link 236 on route to its final destination at the point 270. In one embodiment, a bid generator, or computer-executable instructions executing in concert with the bid generator, can select whether to route the quantum of data along the link 234 or, alternatively, along the link 236. Such a decision can be informed by other specifications or requirements, which, in addition to the bid information 212, can also be transmitted with the quantum of data 210. For example, although not specifically illustrated in FIG. 2, routing information can be provided and transmitted along with the quantum of data 210. Such routing information can specify specific links or paths that the associated quantum of data 210 is to be routed along, can specify specific links or paths that the associated quantum of data 210 is to avoid, or can specify combinations thereof. In an embodiment where routing information is provided with the quantum of data 210, a decision, such as the decision at the point 230, as to which link to submit bids to for the quantum of data 210, can be made based upon such explicit routing information. Thus, for example, if routing information provided together with the quantum of data 210 had indicated that the quantum of data 210 is to be routed along links 234, 245 and 256, then, at the point 230, a decision can be made to bid for the transmission of the quantum of data 210 along the link 234, and not bid for the transmission of the quantum of data 210 along the link 236. Similarly, if routing information provided together with the quantum of data 210 had indicated that the quantum of data 210 is to avoid the link 236, then, at the point 230, a decision can be made to bid for the transmission of the quantum of data 210 along with link 234, as opposed to the link 236.

In another embodiment, the quantum of data 210 may not have any specific routing information associated, or transmitted, with it. In such an embodiment, a decision can be made regarding which link to bid for based upon other specified criteria such as, for example, a specified latency. For example, routing the quantum of data 210 along the links 234, 245 and 256 can result in a greater latency than routing the quantum of data 210 along the link 236, as an alternative. Consequently, if specified latency information, which can also be transmitted along with the quantum of data 210, prevents the routing of the quantum of data along the links 234, 245 and 256, then, at the point 230, a decision can be made to bid for the transmission of the quantum of data 210 along the link 236. More specifically, if the quantum of data 210 was transmitted along with a latency requirement that specified a latency of two milliseconds, and transmission of the quantum of data 210 along the links 234, 245 and 256, together with the transmission of the quantum of data 210 along the links up to the point where the decision is being made, such as the point 230, would result in a greater than two millisecond latency, then a decision can be made, at the point 230, to bid on the transmission of the quantum of data 210 along the link 236.

In yet another embodiment, decisions as to routing can be based upon historical information available from such a bid-based network. More specifically, the "winning" bid, and, consequently, the price charged, for the transmission of a quantum of data along a link can be reported, such as to a central monitoring component. Such a central monitoring component can generate a "heat map" or other like visual amalgamation of cost data indicating the most recent cost charged in order to transmit a quantum of data along a link. As will be recognized by those skilled in the art, more congested links are likely to be revealed via higher costs charged in order to transmit quanta of data along such links. Conversely, less congested links are likely to have substantially lower prices paid in order to transmit quanta of data along such links. In such an embodiment, in selecting a routing for a quantum of data, such historical information can be referenced and a link, or collection of links, having, for example, a lower cost paid to route quanta of data along them can be selected. Thus, for example, if such historical data reveals that the most recent prices paid to transmit a quantum of data along the links 234, 245 and 256 were, respectively, twenty dollars, ten dollars and ten dollars, and the most recent prices paid to transmit a quantum of data along the link 236 was sixty dollars, then a decision can be made, at the point 230, to place bids for the transmission of the quantum of data 210 along the link 234, instead of the link 236.

Once a decision is made, a bid can be generated for the quantum of data 210, such as based on the bid information 212, for a link emanating from the point 230, such as either the link 234, or the link 236, in the exemplary system 200 of FIG. 2. For purposes of continuing with a description of the progress of the quantum of data 210, a bid can be placed for the transmission of the quantum of data 210 along the link 234. In one embodiment, such a bid can be equivalent to all of the remaining portion of the aggregate bid, such as could be indicated by the bid information 213 since the amount paid will not be greater than an amount incrementally higher than the next highest bid and, by bidding all of the remaining portion of the aggregate bid, the chances that the bid is selected are increased. In another embodiment, only a portion of the remaining portion of the aggregate bid, such as a predefined percentage that can be based on the remaining links to be transited, the links already transited, or other criteria, can be bid. Such an alternative embodiment can reduce the chances that links earlier in an end-to-end transmission inappropriately generate higher revenue merely due to their position within an overall end-to-end transmission.

For purposes of continuing with the example illustrated in FIG. 2, a bid placed for the transmission of the quantum of data 210 across the link 234 can "win" at a price of twenty dollars, as illustrated by the determination 231, and the quantum of data 210 can be transmitted along the link 234, together with bid information 213 which can, as before, be based upon the prior bid information 212, as well as the amount paid for the transmission along the current link, such as indicated by the determination 231. In such a manner, the quantum of data 210 can proceed through the system 200 of FIG. 2. For example, at the point 240, a bid can be placed for the transmission of the quantum of data 210 through the link 245. Such a bid can be won at the exemplary rate of ten dollars, as illustrated by the decision 241, and the quantum of data 210, together with bid information 214 can be transmitted through the link 245 to the point 250. As before, the bid information 214 can be based on the prior bid information 213 the amount charged to transmit the quantum of data 210 along with a link 245. Analogously, at the point 250, a decision can be made to bid on the transmission of the quantum of data 210 through the link 256, the bid can win at a price of ten dollars, and the quantum of data 210 can be transmitted along the link 256, together with bid information 215. And lastly, at the point 260, a decision can be made to bid on the transmission of the quantum of data 210 via the link 267 to a point 270, which can be a destination point for the quantum of data 210. Exemplarily, the bidding for the transmission along the link 267 can be won for fifteen dollars, and the quantum of data 210 can be transmitted along the link 267 to the point 270, together with the bid information 216. In such a manner, the quantum of data 210 can be delivered from the point 220 to the point 270 for, in the example illustrated by the system 200 of FIG. 2, eighty dollars.

In one embodiment, the quantum of data 210 may not make it to the point 270. In such an instance, in one embodiment, even if the quantum data 210 had traversed one or more of the links 223, 234, 236, 245, 256 and 267, the failure to deliver the quantum of data to the point 270 to which it was directed can result in the customer of the network service provider not being charged any amount. In an alternative embodiment, the customer may be charged for the links that such a quantum may have already traversed, even though it did not reach the destination to which it was directed. A quantum of data, such as the quantum of data 210, can fail to reach an endpoint due to a myriad of reasons. In one embodiment, such reasons can include an explicit dropping of the quantum of data by the network due to a failure, by the network, to meet the criteria specified as part of the transmission of the quantum of data 210. For example, as indicated previously, one or more requirements or specifications can be transmitted together with the quantum of data 210 including, for example, the bid information 211 and latency information. Such information can be utilized to determine that the quantum of data 210 should not be transmitted further and should, instead, be dropped.

For example, if the aggregate bid amount for the transmission of the quantum of data 210 from the point 220 to the point 270 was not one hundred dollars, as illustrated in FIG. 2, but was rather sixty-five dollars, then, upon completion of the transmission of the quantum of data 210 through the link 256, assuming that the processing of the quantum of data 210 occurred in accordance with the example detailed above, all of the aggregate bid amount of sixty-five dollars can have been "used up" transmitting the packet to the point 260. From the point 260, therefore, there can remain no additional amount that can be bid, such as by a bid generator, for the transmission of the quantum of data 210 through the link 267. In such an embodiment, therefore, the quantum of data 210 can be dropped after it is delivered to the point 260. Subsequently, due to the ultimate failure of the quantum of data 210 to be transmitted from the point 220 to the point 270, a failure notification can be generated, so as to enable a customer to resend the quantum of data 210.

As another example, if the aggregate bid amount for the transmission of the quantum of data 210 from the point 220 to the point 270 was seventy dollars, then, upon completion of the transmission of the quantum of data 210 through the link 256, assuming that the processing of the quantum of data 210 occurred in accordance with the example detailed above, sixty-five dollars can have been "used up" transmitting the packet to the point 260, leaving only five dollars for the bid generator to bid on the transmission of the quantum of data 210 through the link 267. A bid of five dollars may not be sufficient to "win" transmission of the quantum of data 210 through the link 267. Nevertheless, a bid generator can continue to generate bids of the five dollars. In one embodiment, such bidding can continue until either a five dollar bid "wins", such as due to the dearth of other bidders, and the quantum of data 210 is, ultimately, delivered to the point 270, or until another requirement or specification mandates that the quantum of data 210 be dropped. For example, if a latency requirement was associated with the quantum of data 210, and transmitted therewith, the failure of the five dollar bid to secure transmission of the quantum of data in an expedited manner can result in a sufficient amount of time elapsing from the initial transmission of the quantum of data 210 such that the latency requirement associated with the quantum of data 210 can no longer be met. In such an instance, the quantum of data 210 can be dropped at the point 260 due to a failure of the transmission of the quantum of data 210 to meet the latency requirements associated therewith. The failure to meet such latency requirements can, as illustrated by such an example, be due to an insufficient amount of funds available for bidding.

Figure 3:
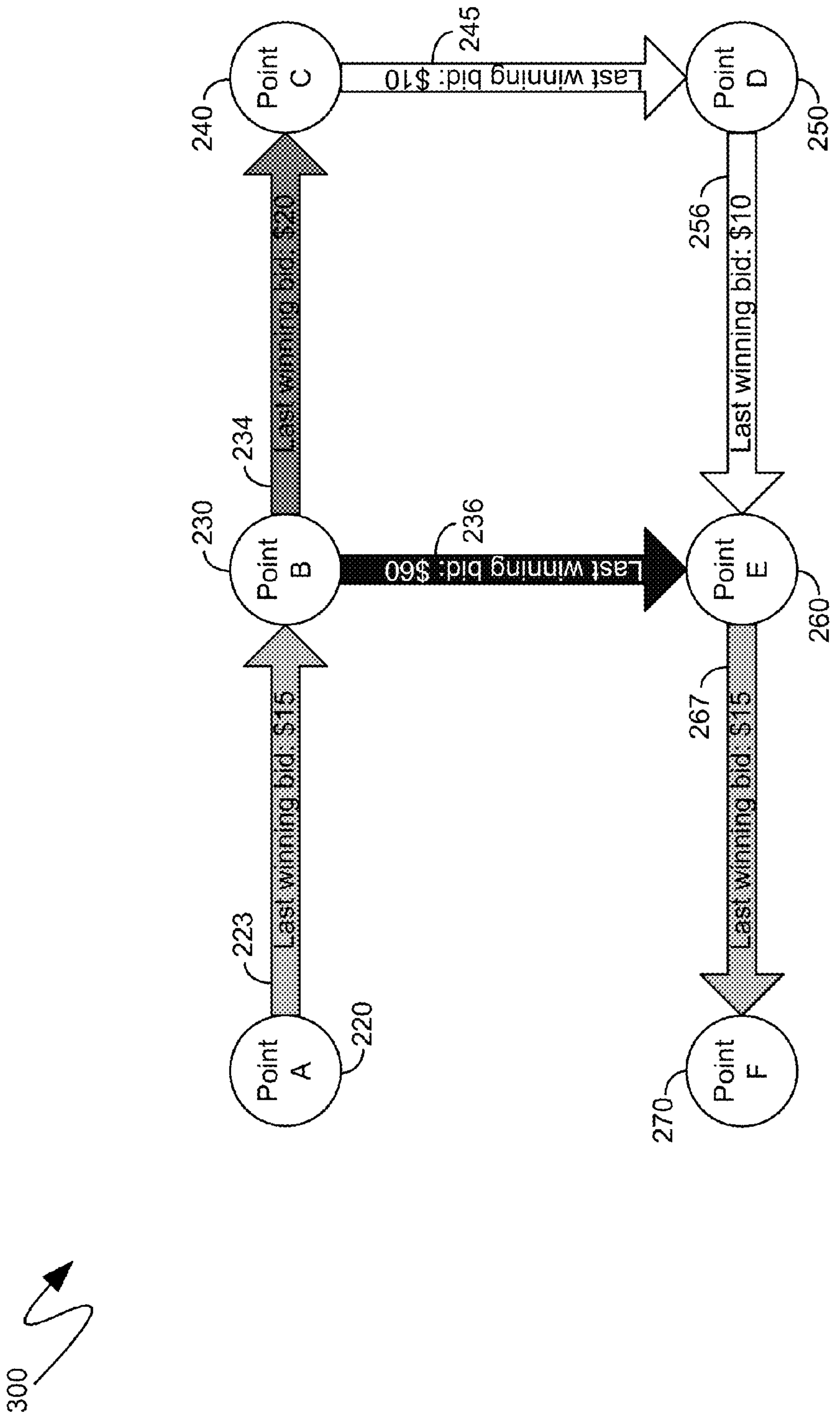
FIG. 3 is a block diagram of an exemplary pricing information provided by a bid-based network.

Turning to FIG. 3, in one embodiment, historical data regarding the monetary value established by the above-described bidding process, namely the "winning bids" for the transfer of a quantum of data across a network link, can be retained and utilized for routing, network capacity planning, and other uses. For example, if the quanta of data for which bids are received is small, such as a single packet, then information regarding the immediately past winning bid for a particular link can be only a fraction of a second old and can, thereby, be essentially real-time information that can be utilized for routing purposes. In one embodiment, such immediately past winning bids can be tracked in a "heat map" or other like data presentation where the monetary value can be represented through colors, shapes, or other like representations. The system 300 of FIG. 3 illustrates one such exemplary heat map. Thus, for example, the links 245 and 256 can have light shading indicating that their immediately past winning bids were monetarily low such as, for example, the exemplary ten dollar winning bids illustrated in FIG. 3. The links 223 and 267 can have slightly darker shading indicating that their immediately past winning bids were monetarily slightly higher such as, for example, the exemplary fifteen dollar winning bids illustrated in FIG. 3. Analogously, the shading applied to the link 234 can be even darker, as its immediately past winning bid can be, exemplarily, twenty dollars. Lastly, the shading applied to the link 236 can be darkest indicating a higher monetary value than that of the winning bids of the other links, such as, exemplarily, sixty dollars.

In one embodiment, such information can be utilized for routing purposes. For example, as indicated previously, data can be routed around the link 236 due to the high cost associated with data that is passed through the link 236. In another embodiment, such information can be utilized for network capacity planning purposes. For example, the investment in additional network capacity along the link 236 can be financially more lucrative than the investment in additional network capacity along any other link of the system 300 of FIG. 3, because communications along the link 236 can generate, as illustrated by the immediately past winning bid data, substantially more revenue than communications along other links. Automated processes can further analyze the historical data to enable "what-if" scenario modeling to further aid in network capacity planning. For example, the non-winning bids in a congested link may become winning bids as more capacity, in the form of other links, is added. Consequently, such non-winning bids can provide an estimate as to how much revenue could be generated if capacity was expanded. Traditional analysis metrics, such as Return On Investment (ROI) can then be automatically generated based on the expected revenue, as estimated from the historical data, and the cost of the capacity expansion.

Figure 4:
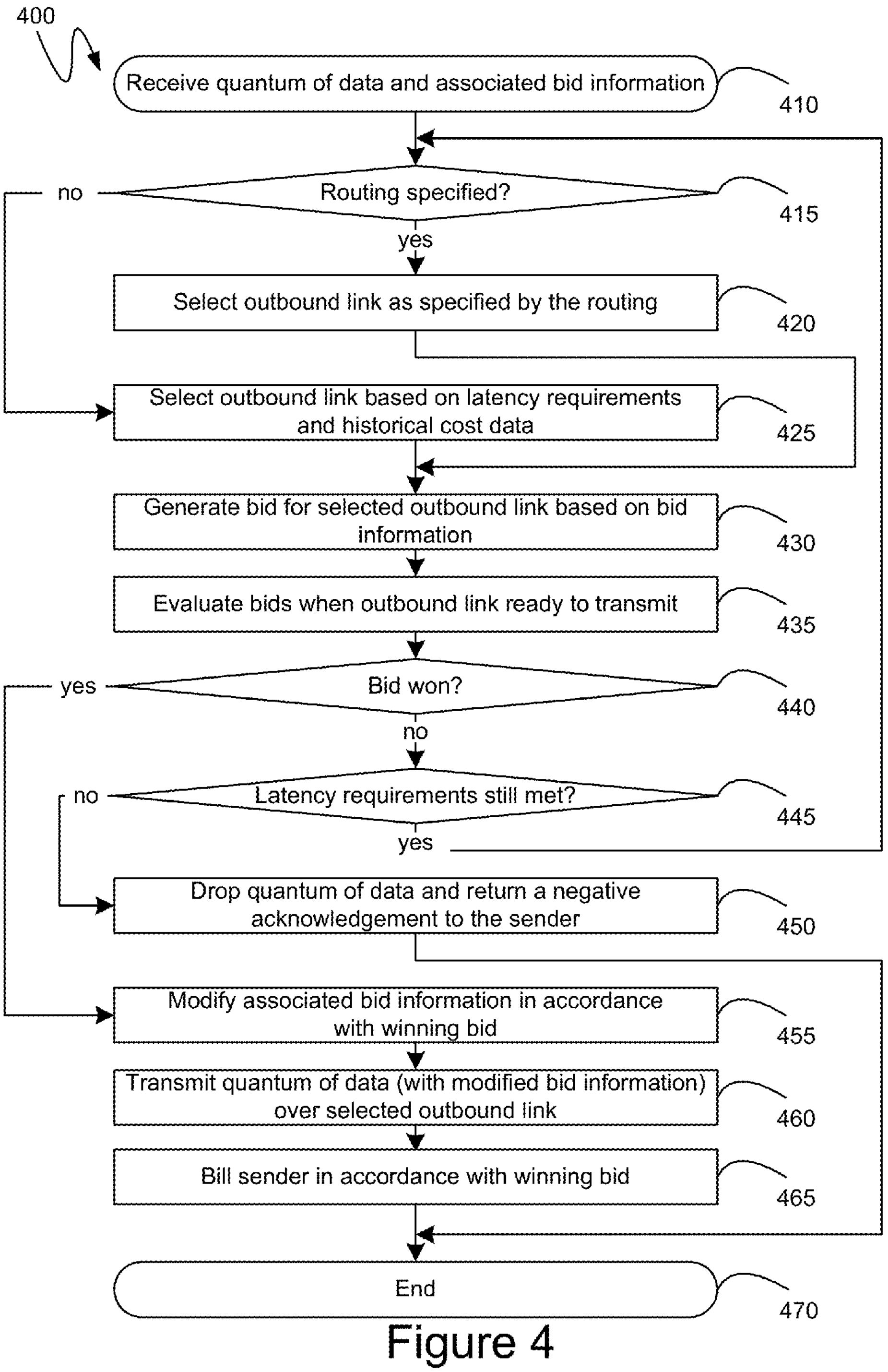
FIG. 4 is a flow diagram of an exemplary evaluation transmission of data across a bid-based network.

Turning to FIG. 4, the flow diagram 400 shown therein illustrates an exemplary series of steps for implementing a bid-based network capacity allocation system. Initially, at step 410, a quantum of data for transmission over at least some of a network can be received, together with associated bid information. As indicated above, such bid information can be individual bids for individual links of a network, or can be a single aggregated to bid for an end-to-end transmission of the quantum of data across the network. Subsequently, at step 415 a determination can be made as to whether, in addition to associated bid information, routing information was also specified for the quantum of data received at step 410. If routing information was received, then an outbound link can be selected at step 420 in accordance with such routing information. Conversely, if no routing information was specified, then, at step 425 an outbound link can be selected based on other criteria such as, for example, avoiding links whose historical costs are high, or avoiding the links that will result in not meeting specified latency requirements.

Whether the link is selected at step 420, or step 425, processing can proceed to step 430 where a bid can be generated, bidding on the transmission of the quantum of data, received at step 410, over the outbound link selected at either step 420 or step 425. In one embodiment, as described in detail above, the bid generated at step 430 can be in accordance with the associated bid information that was received with the quantum of data at step 410. When the selected outbound link is ready to transmit the quantum of data, or a portion thereof, bids directed to the transmission of data over the selected outbound link can be evaluated, as indicated at step 435. As described in detail above, the evaluation of bids can include the sorting of such bids in accordance with one or more criteria including, for example, monetary value if, for example, revenue maximization is sought.

At step 440, a determination can be made as to whether the bid that was generated at step 430 has "won" in the sense of being selected such that the associated quantum of data, received at step 410, can be transmitted over the outbound link. If the generated bid did win, as determined at step 440, processing can proceed to step 455, as will be described further below. Conversely, if the generated bid did not win, processing can proceed to step 445 where a determination can be made as to whether other requirements or specifications, such as latency requirements, are still being met. If, at step 445, it is determined that latency requirements are not going to be met, then processing can proceed to step 450 where the quantum of data can be dropped, or discarded. The relevant processing can then end at step 470. Conversely, if, at step 445, it is determined that latency requirements are still being met, or, analogous to, that other specified requirements are being met, then processing can return to step 415 in which case another bid can, ultimately, be generated at step 430, either for the same outbound link, or for a new outbound link that can be selected as part of the re-performance of steps 420 or 425.

Returning back to step 440, if the generated bid has won, processing can proceed to step 455 where, optionally, the associated bid information that was received at step 410 can be modified in accordance with the winning bid. For example, as detailed above, if the associated bid information was an aggregate bid for an end-to-end transmission of the quantum of data, then such associated bid information can be modified to include the amount that will be charged to the customer transmitting the quantum of data for the transmission of the quantum of data across the outbound link. Subsequently, at step 460, the quantum of data, together with any associated information, can be transmitted over the selected outbound link. At step 465, information regarding the amount of the winning bid, or other like information, can be provided to an invoicing computing device, or other like computing device, into the customer transmitting the quantum of data that was received at step 410 can be billed in accordance with the monetary amount of the winning bid, as determined at step 435. The relevant processing can then end at step 470.

Figure 5:
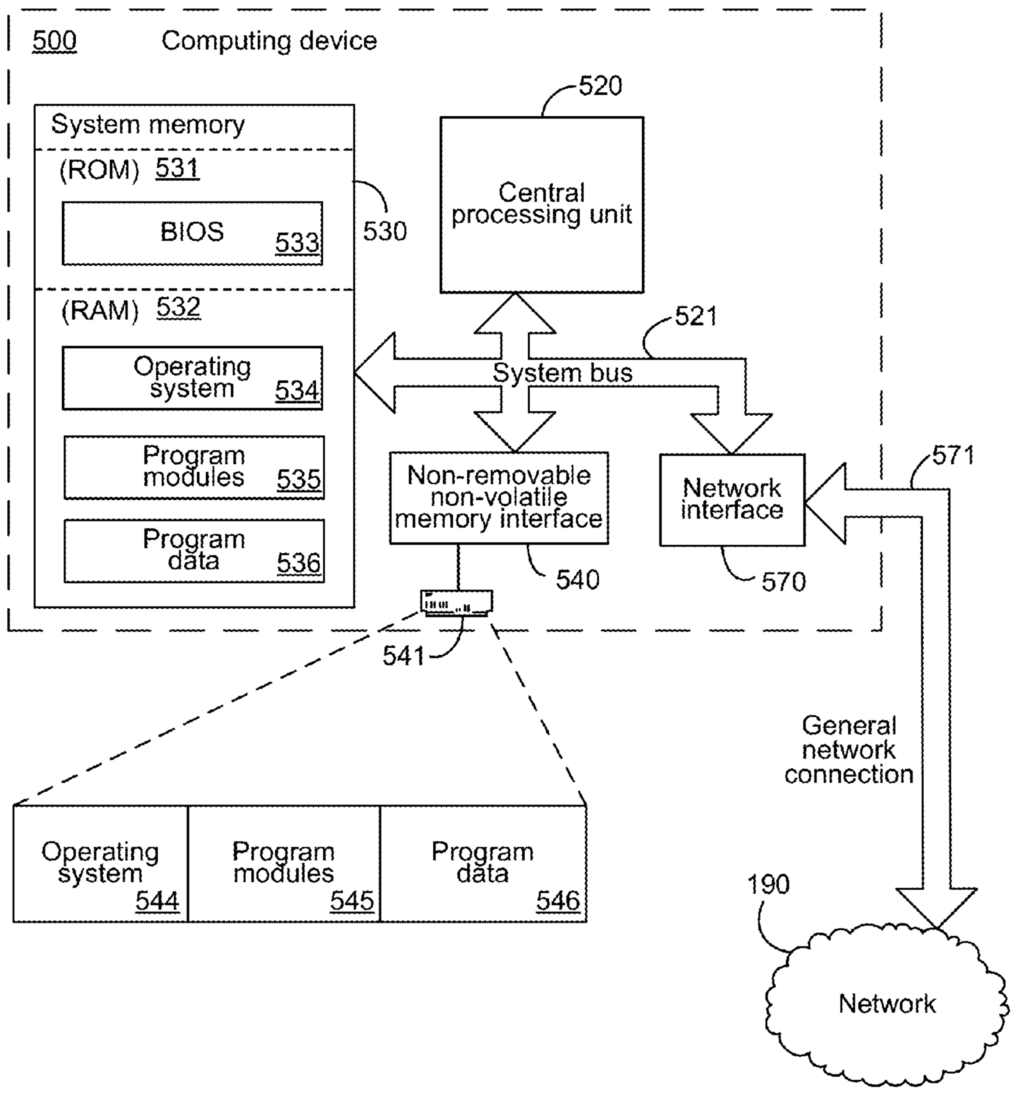
FIG. 5 is a block diagram illustrating an exemplary general purpose computing device.

Turning to FIG. 5, an exemplary computing device, such as one of specific-purpose or computing devices performing or aiding in the performance of the mechanisms described above, is illustrated in the form of the exemplary computing device 500. As utilized herein, the term "computing device" includes both general-purpose and specific-purpose computing devices, as enumerated above, and also include individual components or collections thereof, such as the above-referenced ASICs, Field Programmable Gate Arrays (FPGAs) are other like components or processing units. The exemplary computing device 500 of FIG. 5 can include, but is not limited to, one or more central processing units (CPUs) 520, a system memory 530 and a system bus 521 that couples various system components including the system memory to the processing unit 520. The system bus 521 may be any of several types of bus structures including a memory bus or memory controller, a peripheral bus, and a local bus using any of a variety of bus architectures. Depending on the specific physical implementation, one or more of the CPUs 520, the system memory 530 and other components of the computing device 500 can be physically co-located, such as on a single chip. In such a case, some or all of the system bus 521 can be nothing more than communicational pathways within a single chip structure and its illustration in FIG. 5 can be nothing more than notational convenience for the purpose of illustration.

The computing device 500 also typically includes computer readable media, which can include any available media that can be accessed by computing device 500. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

When using communication media, the computing device 500 may operate in a networked environment via logical connections to one or more remote computers. The logical connection depicted in FIG. 5 is a general network connection 571 to the network 190, which can be a local area network (LAN), a wide area network (WAN) such as the Internet, or other networks. The computing device 500 is connected to the general network connection 571 through a network interface or adapter 570 that is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 571. It will be appreciated that the network connections shown are exemplary and other means of establishing a communications link between computing devices may be used.

The computing device 500 may also include other removable/non-removable, volatile/nonvolatile computer storage media. By way of example only, FIG. 5 illustrates a hard disk drive 541 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers here to illustrate that, at a minimum, they are different copies.

As can be seen from the above descriptions, a bid-based network capacity allocation system has been presented. Which, in view of the many possible variations of the subject matter described herein, we claim as our invention all such embodiments as may come within the scope of the following claims and equivalents thereto.

We claim:

1. A computing device transmitting a quantum of data across a link in a computer network, the computing device comprising:

- a network interface through which the computing device can transmit data across multiple different outbound links; and
- one or more processing units configured to perform steps comprising:
  - receiving a quantum of data that is being transmitted to a destination and associated bid information;
  - selecting at least one outbound link, from among the multiple different outbound links, the selecting being informed by the destination;
  - generating a bid, based on the associated bid information, for a transmission of the received quantum of data across the selected outbound link; and
  - transmitting the received quantum of data across the selected outbound link only if the generated bid was accepted.

2. The computing device of claim 1, wherein the associated bid information comprises information indicating a remaining amount of an aggregate bid, the aggregate bid representing a bid for an end-to-end transmission of the quantum of data, the outbound link being only one link among multiple links in the end-to-end transmission; and wherein further the generating the bid comprises generating the bid to equal the remaining amount of the aggregate bid.

3. The computing device of claim 1, wherein the associated bid information comprises information indicating a remaining amount of an aggregate bid, the aggregate bid representing a bid for an end-to-end transmission of the quantum of data, the outbound link being only one link among multiple links in the end-to-end transmission; and wherein further the generating the bid comprises generating the bid to equal a predefined portion of the remaining amount of the aggregate bid.

4. The computing device of claim 1, wherein the one or more processing units are further configured to perform steps comprising: receiving latency requirements associated with the quantum of data; and wherein the generating the bid comprises generating the bid only if the latency requirements associated with the quantum of data are still being satisfied.

5. The computing device of claim 1, wherein the one or more processing units are further configured to perform steps comprising: receiving routing information associated with the quantum of data; wherein the selecting is further informed by the received routing information.

6. The computing device of claim 1, wherein the selecting is further informed by historical pricing information associated with the multiple different outbound links, the historical pricing information having been established through a bid selection process.

7. The computing device of claim 1, wherein the quantum of data is a single packet.

8. A method of routing data across a computer network comprising multiple links, each of the multiple links having link endpoints, the method comprising the steps of:

generating bids, from bid information associated with quanta of data, for transmission of the quanta of data across a first link of the computing network;

sorting, in accordance with a sorting criteria, the generated bids;

transmitting, across the first link of the computing network, a quantum of data associated with a highest bid after the sorting;

repeating the generating for at least some of the quanta of data that have not yet been transmitted across the first link; and repeating the generating, the sorting and the transmitting for other links of the computing network.

9. The method of claim 8, further comprising the steps of: charging a customer, for the transmitting the quantum of data associated with the highest bid across the first link of the computing network, an amount one increment greater than a value of a next highest bid from among the sorted bids.

10. The method of claim 8, wherein the sort criteria is a monetary amount of a bid.

11. The method of claim 8, further comprising the step of: presenting historical pricing information for the computer network on a per-link basis, each link indicating a prior amount charged to transmit data across that link.

12. The method of claim 11, further comprising the step of: preprocessing the historical pricing information to generate metrics aiding in capacity planning.

13. The method of claim 11, further comprising the step of: selecting links for which to generate bids, from among multiple different links, the selecting being informed by the historical pricing information.

14. The method of claim 8, further comprising the step of: receiving routing information associated with at least some of the quanta of data; and selecting links for which to generate bids, from among multiple different links, for the at least some of the quanta of data, the selecting being informed by the routing information.

15. The method of claim 8, wherein the sorting occurs at a time when the first link of the computing network is ready to transmit data.

16. A method of transmitting a quantum of data across a link in a computer network, the method comprising the steps of:

receiving a quantum of data that is being transmitted to a destination and associated bid information;

selecting at least one outbound link, from among multiple different outbound links, the selecting being informed by the destination;

generating a bid, based on the associated bid information, for a transmission of the received quantum of data across the selected outbound link; and transmitting the received quantum of data across the selected outbound link only if the generated bid was selected.

17. The method of claim 16, wherein the associated bid information comprises information indicating a remaining amount of an aggregate bid, the aggregate bid representing a bid for an end-to-end transmission of the quantum of data, the outbound link being only one link among multiple links in the end-to-end transmission; and wherein further the generating the bid comprises generating the bid to equal the remaining amount of the aggregate bid.

18. The method of claim 16, wherein the associated bid information comprises information indicating a remaining amount of an aggregate bid, the aggregate bid representing a bid for an end-to-end transmission of the quantum of data, the outbound link being only one link among multiple links in the end-to-end transmission; and wherein further the generating the bid comprises generating the bid to equal a predefined portion of the remaining amount of the aggregate bid.

19. The method of claim 16, further comprising the steps of: receiving latency requirements associated with the quantum of data; and wherein the generating the bid comprises generating the bid only if the latency requirements associated with the quantum of data are still being satisfied.

20. The method of claim 16, further comprising the steps of: receiving routing information associated with the quantum of data; wherein the selecting is further informed by the received routing information.

* * * * *